United States Patent
Alvi et al.

(10) Patent No.: US 12,451,831 B2
(45) Date of Patent: Oct. 21, 2025

(54) CONTROL OF SWITCHING SPEED IN A MULTIPHASE INVERTER

(71) Applicant: GM Global Technology Operations LLC, Detroit, MI (US)

(72) Inventors: Muhammad Hussain Alvi, Troy, MI (US); Yilun Luo, Ann Arbor, MI (US); Brian A Welchko, Oakland Township, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 18/342,248

(22) Filed: Jun. 27, 2023

(65) Prior Publication Data

US 2025/0007440 A1   Jan. 2, 2025

(51) Int. Cl.
| | |
|---|---|
| *B60L 15/20* | (2006.01) |
| *B60L 15/00* | (2006.01) |
| *B60L 50/51* | (2019.01) |
| *H02P 27/08* | (2006.01) |

(52) U.S. Cl.
CPC ......... *H02P 27/085* (2013.01); *B60L 15/007* (2013.01); *B60L 50/51* (2019.02); *B60L 2210/42* (2013.01)

(58) Field of Classification Search
CPC .... H02P 27/085; B60L 50/51; B60L 2210/42; B60L 15/2009; H02M 1/4258
See application file for complete search history.

(56) References Cited

U.S. PATENT DOCUMENTS

| | | | |
|---|---|---|---|
| 2015/0256105 A1* | 9/2015 | Kano | B60L 15/2009 363/131 |
| 2024/0106352 A1* | 3/2024 | Gose | H02M 1/4258 |

FOREIGN PATENT DOCUMENTS

JP   2009189173 A   8/2009

OTHER PUBLICATIONS

Bakran, M. et al.; "Multicommunication of IGBTS in Large Inverters"; European Conference on Power Electronics and Applications, Published on IEEE Explore (2005) DOI: 10.1109/EPE.2005.219249.

Bakran, M. et al.; "Multiple turn on of IGBTs in Large Inverters"; 32nd Annual Conference on IEEE Industrial Electronics, Published on IEEE Explore; pp. 1609-1614 (2006) DOI:10.1109/IECON.2006.347218.

German Office Action, German Application No. 102023127176.8, issued Feb. 27, 2024; 8 pages.

* cited by examiner

*Primary Examiner* — Cortez M Cook
(74) *Attorney, Agent, or Firm* — CANTOR COLBURN LLP

(57) ABSTRACT

A system includes an inverter configured to output multiphase alternating current (AC) currents to an electric motor, the multiphase AC currents including a first phase current and a second phase current, the inverter including a set of switches for each phase current. The system also includes a switching controller operably connected to each set of switches, the switching controller configured to control a gate driver connected to a switch of the set of switches, the switching controller configured to determine a time difference between a first switching event of a first phase and a second switching event of a second phase during a switching cycle, and control a switching speed of the switch based on the time difference.

20 Claims, 7 Drawing Sheets

CONTROL OF SWITCHING SPEED IN A MULTIPHASE INVERTER

INTRODUCTION

The subject disclosure relates to switching devices, and more particularly to controlling switching speed of switching devices.

High speed switching devices are used in a variety of applications. For example, electric and hybrid electric vehicles feature conversion devices such as DC-DC converters and inverters. Such devices are used to control power supply from battery storage to electric motors, electronics and other vehicle subsystems. Switching speeds (i.e., slew rates) are an important factor to consider when designing and operating conversion devices. For example, if switching speeds are too low, efficiency can be compromised. Conversely, switching speeds that are too fast can cause voltage overshoots and other negative effects. Accordingly, it is desirable to provide systems and techniques for controlling switching speeds to achieve high efficiency with reduced negative effects.

SUMMARY

In one exemplary embodiment, a system includes an inverter configured to output multiphase alternating current (AC) currents to an electric motor, the multiphase AC currents including a first phase current and a second phase current, the inverter including a set of switches for each phase current. The system also includes a switching controller operably connected to each set of switches, the switching controller configured to control a gate driver connected to a switch of the set of switches, the switching controller configured to determine a time difference between a first switching event of a first phase and a second switching event of a second phase during a switching cycle, and control a switching speed of the switch based on the time difference.

In addition to one or more of the features described herein, the time difference is determined based on timing information specifying a timing of switching events according to a modulation scheme.

In addition to one or more of the features described herein, the modulation scheme is pulse width modulation (PWM).

In addition to one or more of the features described herein, the time difference is determined based on a duty cycle specified by the timing information.

In addition to one or more of the features described herein, the switching controller is configured to compare the time difference to a time threshold representing a desired separation between the first switching event and the second switching event, and adjust a switching speed of the switch based on the time difference being less than the time threshold.

In addition to one or more of the features described herein, the time difference is determined based on a dwell time between the first switching event and the second switching event.

In addition to one or more of the features described herein, the timing information includes space vector information representing the multiphase AC currents, the vector information including a plurality of space vectors representing switching states, the space vectors defining a plurality of sectors.

In addition to one or more of the features described herein, the time difference is determined based on a synthesized reference vector, the time threshold is a minimum distance between the synthesized reference vector and a space vector, and the switching controller is configured to adjust the switching speed based on an estimated distance between the synthesized reference vector and the space vector being less than the minimum distance.

In addition to one or more of the features described herein, controlling the switching speed is applied to only one switch of the inverter.

In another exemplary embodiment, a method includes receiving electrical power by an inverter configured to output multiphase AC currents to an electric motor, the multiphase AC currents including a first phase current and a second phase current, the inverter including a set of switches for each phase current, each switch of the set of switches controllable by a gate driver. The method also includes determining a time difference between a first switching event of a first phase and a second switching event of a second phase during a switching cycle, and controlling a gate driver connected to a switch of the set of switches to control a switching speed of the switch based on the time difference.

In addition to one or more of the features described herein, the time difference is determined based on timing information specifying a timing of switching events according to a modulation scheme.

In addition to one or more of the features described herein, determining the time difference includes comparing the time difference to a time threshold representing a desired separation between the first switching event and the second switching event, and controlling the gate driver is performed to adjust a switching speed of the switch based on the time difference being less than the time threshold.

In addition to one or more of the features described herein, the time difference is determined based on a dwell time between the first switching event and the second switching event.

In addition to one or more of the features described herein, the timing information includes space vector information representing the multiphase AC currents, the space vector information including a plurality of space vectors representing switching states, the space vectors defining a plurality of sectors.

In addition to one or more of the features described herein, the time difference is determined based on a synthesized reference vector, the time threshold is a minimum distance between the synthesized reference vector and a space vector, and controlling the gate driver is performed to adjust the switching speed based on an estimated distance between the synthesized reference vector and the space vector being less than the minimum distance.

In addition to one or more of the features described herein, controlling the switching speed is applied to only one switch of the inverter.

In yet another exemplary embodiment, a vehicle system includes an inverter configured to output multiphase AC currents to an electric motor for propulsion of the vehicle, the multiphase AC currents including a first phase current and a second phase current, the inverter including a set of switches for each phase current. The vehicle system also includes a processor configured determine a time difference between a first switching event of a first phase and a second switching event of a second phase during a switching cycle, compare the time difference to a time threshold representing a desired separation between the first switching event and the second switching event, and based on the time difference being less than the time threshold, control a gate driver connected to a switch of the set of switches to adjust a switching speed of the switch.

In addition to one or more of the features described herein, the time difference is determined based on timing information specifying the timing of switching events according to a modulation scheme.

In addition to one or more of the features described herein, the time difference is determined based on a dwell time between the first switching event and the second switching event.

In addition to one or more of the features described herein, the timing information includes space vector information representing the phase currents, the vector information including a plurality of space vectors representing switching states and defining a plurality of sectors, wherein the time difference is determined based on a synthesized reference vector, the time threshold is a minimum distance between the reference vector and a space vector, and the control of the gate driver includes adjusting the switching speed based on an estimated distance between the reference vector and the space vector being less than the minimum distance.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
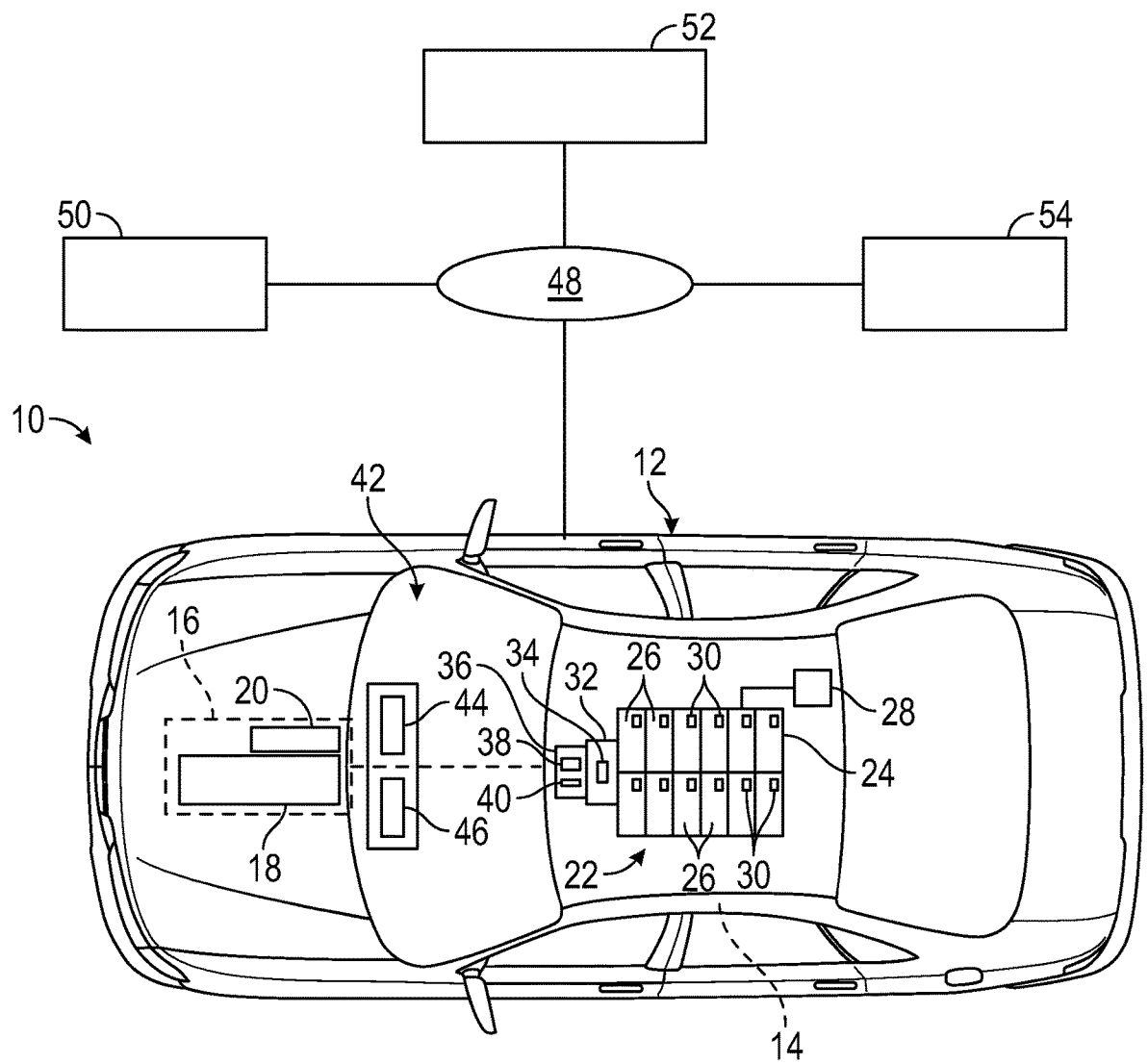
FIG. 1 is a top schematic view of a motor vehicle including a battery assembly and a switching control system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for controlling operation of a conversion device or other electronic device that includes one or more semiconductor switches (e.g., metal-oxide-semiconductor field-effect transistors (MOSFETs) or power MOSFETs). An embodiment of a switching control system includes a switch control device operably connected to an inverter having semiconductor switches controlled to generate one or more alternating current (AC) currents. For example, the inverter is a three-phase or multiphase (e.g., 6 phases) inverter that applies an AC current for each phase (referred to as a "phase current") to one or more electric motors in a vehicle.

The switch control device is operably connected to a gate of a semiconductor switching device (i.e., switch) and is configured to control switching speed or slew rate based on the timing of switching events performed during inverter control, such as opening and closing switches associated with each phase. In an embodiment, the switch control device alters the slew rate of a switch based on a temporal distance or time difference that separates a switching event from another switching event in another phase.

In an embodiment, the switch control device is configured to determine the time difference based on timing information that prescribes parameters (e.g., pulse width, duty cycle, etc.) of a modulation scheme used to generate phase currents. An example of a modulation scheme is pulse width modulation (PWM). The timing information may be in the form of a timing diagram, phase diagram or other data structure.

During a switching cycle, the timing information is used to determine a level of overlap that corresponds to the time difference (e.g., dwell time), and compare the time difference to an overlap window or other time threshold. An overlap window is a minimum time duration from the onset of a switching event for a given phase to the onset of a subsequent switching event. If the switch control device determines that the time difference is less than the overlap window, the switching speed of a switch in the inverter is reduced or otherwise adjusted to reduce or minimize negative effects that would otherwise occur. In this way, voltage overshoot, current transients and other effects are mitigated, while allowing for simultaneous or overlapping switching events.

Embodiments described herein present numerous advantages and technical effects. For example, the embodiments provide for precise control of switching speeds, so that switching speeds can be optimized to provide maximum performance and efficiency while avoiding negative effects, such as voltage overshoot. In addition, the embodiments provide for control without the need to make significant hardware changes.

For example, in vehicle inverters, it is typically desired to switch as fast as possible. With wide bandgap (WGB) semiconductors used in inverters, semiconductor switching events can reach voltage transients dV/dt (where dV is a change in voltage and dt is change in time) greater than 10 k V/μs (voltage per microsecond) and current transients dI/dt (where dI is a change in current) greater than 10 k A/μs (amps per microsecond).

However, transients that are too high can cause damage to inverters and electric motors, by causing voltage overshoot and voltage spikes. Excessive slew rates can result in current transients (di/dt) that cause inverter output voltage overshoots, and can result in voltage transients (dv/dt) that cause motor terminal overshoots.

In addition, simultaneous switching events or overlapping switching events, as well as switching events that are too close together, can cause negative effects. Such effects include overvoltage and extra bearing current spikes, which may result in control and calibration issues. Embodiments described herein allow for overlapping switching events based on switching speed control while reducing or eliminating such negative effects.

Some techniques have been employed to reduce effects from overlapping switching, such as separating switching events to avoid any overlap. However, such a technique can introduce voltage and toque linearity issues. For example, such a technique can introduce torque ripple issues due to voltage distortions caused by modifying commanded voltage pulses from the PWM modulator. Embodiments described herein are able to take advantage of the benefits of high slew rates and overlapping events, while avoiding the issues that can arise by avoiding overlap.

The embodiments are not limited to use with any specific vehicle or device or system that utilizes battery assemblies, and may be applicable to various contexts. For example, the embodiments may be used with automobiles, trucks, aircraft, construction equipment, farm equipment, automated factory equipment and/or any other device or system that may use electronic devices having semiconductor switches.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle may be a combustion engine vehicle, an electrically powered vehicle (EV) or a hybrid electric vehicle (HEV). In an example, the vehicle 10 is a hybrid vehicle that includes a combustion engine 18 and an electric motor 20.

The vehicle 10 includes a battery system 22, which may be electrically connected to the motor 20 and/or other components, such as vehicle electronics. In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 includes various conversion devices for controlling the supply of power from the battery pack 24 to the motor 20 and/or electronic components. The conversion devices include a DC-DC converter module 32 that is electrically connected to the battery system 22 and includes a DC-DC converter circuit (converter) 34.

The conversion devices also include an inverter module 36 that includes an inverter circuit (inverter) 38 and a switching control system 40. The inverter 38 receives DC power from the DC-DC converter 34 and converts direct current (DC) power to alternating current (AC) power that is supplied to the electric motor 20. The inverter 38 including one or more sets of switches or switching devices (e.g., controllable semiconductor switches such as MOSFETs) that are controllable to supply AC power to each phase of the motor 20.

The switching control system 40 includes one or more devices that are configured to control a switching speed or "slew rate" of the sets of switches to maximize drive efficiency while minimizing negative effects such as voltage spikes or overshoots. The switching control system 40 may be part of the same component as shown in FIG. 1, or may be incorporated into a separate component.

The vehicle 10 also includes a computer system 42 that includes one or more processing devices 44 and a user interface 46. The various processing devices and units may communicate with one another via a communication device or system, such as a controller area network (CAN) or transmission control protocol (TCP) bus. In addition, the monitoring unit 28, the inverter module 36, the switching control system 40, the computer system 42 and/or other processing components in the vehicle 10 (e.g., a vehicle control unit) may be configured to communicate with various remote devices and systems such as remote servers and other vehicles. Such communication can be realized, for example, via a network 48 (e.g., cellular network, etc.) and/or via wireless communication. For example, the vehicle 10 may communicate with one or more other vehicles 50, a remote entity 52 (e.g., a workstation, a computer, a server, a service provider, fleet management or monitoring system, etc.), and/or a database or other storage location 54.

Figure 2:
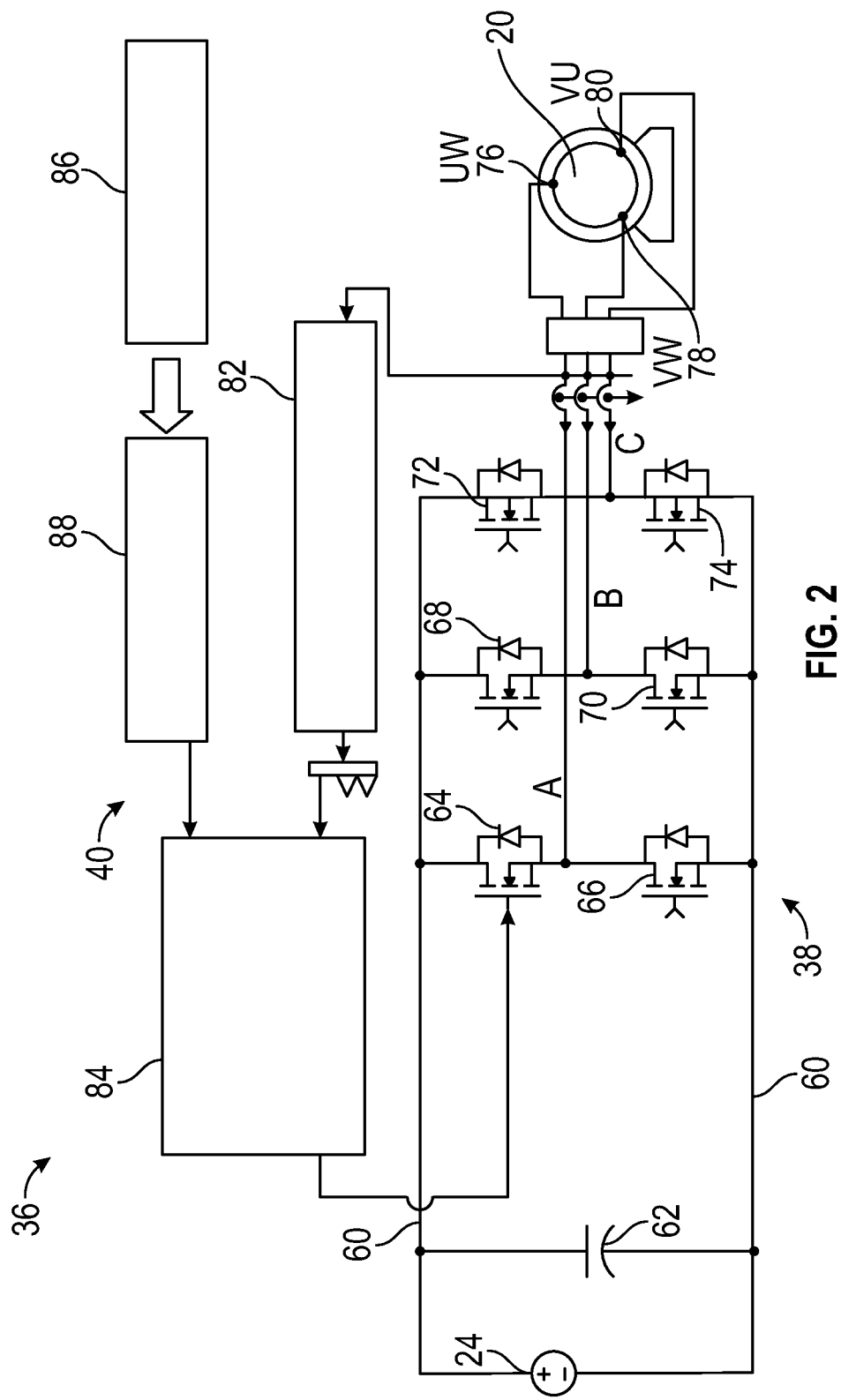
FIG. 2 depicts a conversion device and a switching control system, in accordance with an exemplary embodiment.

FIG. 2 depicts an embodiment of the inverter module 36 including the inverter (inverter circuit) 38 and the switching control system 40. The inverter 38 includes a switching assembly having at least one inverter switch connected to each phase of a three-phase electric motor, such as the motor 20. Each switching assembly is connected in parallel to a propulsion bus 60. Additional components may be included, such as a bulk capacitor 62 (Xcap) for stabilizing voltage. A first switching assembly includes an inverter switch 64 and an inverter switch 66 connected to a first phase (phase A), a second switching assembly includes an inverter switch 68 and an inverter switch 70 connected to a second phase (phase B), and a third switching assembly includes an inverter switch 72 and an inverter switch 74 connected to a third phase (phase C).

In an embodiment, each inverter switch is a semiconductor switch. As non-limiting examples, inverter switches may include metal-oxide-semiconductor (MOS)-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or any other suitable low loss device of suitable voltage and current ratings.

Each phase current is transmitted to respective sets of phase coils in the motor 20. For example, the inverter outputs phase currents for phases A, B and C to motor phases U, V and W, respectively. In the embodiment of FIG. 2, the phase currents are output to a first terminal 76 ("UW terminal"), a second terminal 78 ("VW terminal"), and a third terminal 80 ("VU terminal").

The switching control system 40 includes a controller 82 connected to a gate driver 84. The controller 82 receives phase current measurements from each phase (i.e., samples phase currents Ia, Ib and Ic during a switching cycle) and outputs control signals to drive the switch 64. Although the controller 82 is only shown as connected to the switch 64, it is to be understood that the controller 82 may be connected to drivers of each other inverter switch in the inverter 38.

The controller 82 sends control signals to the gate driver 84 according to a selected modulation or control scheme. The control scheme, in an embodiment, is a pulse width modulation (PWM) control scheme that controls the switches to generate pulses having selected duty cycles (pulse widths). During a switching cycle, each switching assembly is controlled to offset the pulses such that each phase current is separated from the other outputs currents, i.e., each output current has a different phase.

In addition to PWM control, the controller 82 and/or the gate driver 84 is configured to control the switching speed or slew rate of at least one switch in a given switching assembly. For example, the gate driver 84 receives timing information (represented by block 86 in FIG. 2), such as a timing diagram, related to the onset of each switching event in a switching cycle. The timing information is compared to one or more constraints (represented by block 88), which are used by the gate driver 84 and/or the controller 82 to adjust the switching speed of the switch 64, such that the constraints are satisfied. The constraints, in an embodiment, include a minimum time threshold between switching events, such as an overlap window.

Control of switching speed is based on such constraints, and in an embodiment, can be accomplished by controlling only one switch in a switching assembly. For example, if a time difference between a phase A switching event and a phase B switching event is within a selected overlap window, the switching speed of only one switch (e.g., a high side switch of a phase A leg or a high side switch of a phase B leg) can be controlled to reduce negative effects. By controlling the switching speed, simultaneous and overlapping switching can be allowed while reducing or minimizing negative effects with minimal additional processing and control requirements.

Generally, one or more constraints are based on a determination of a minimum time between switching events or minimum separation between switching events. The minimum time can be determined experimentally, based on previous measurements performed at previous switching cycles, based on measurements performed during other periods of vehicle operation, and/or based on other suitable information. The minimum time is discussed herein as an overlap window, but may be characterized or configured in any suitable manner.

Figure 3:
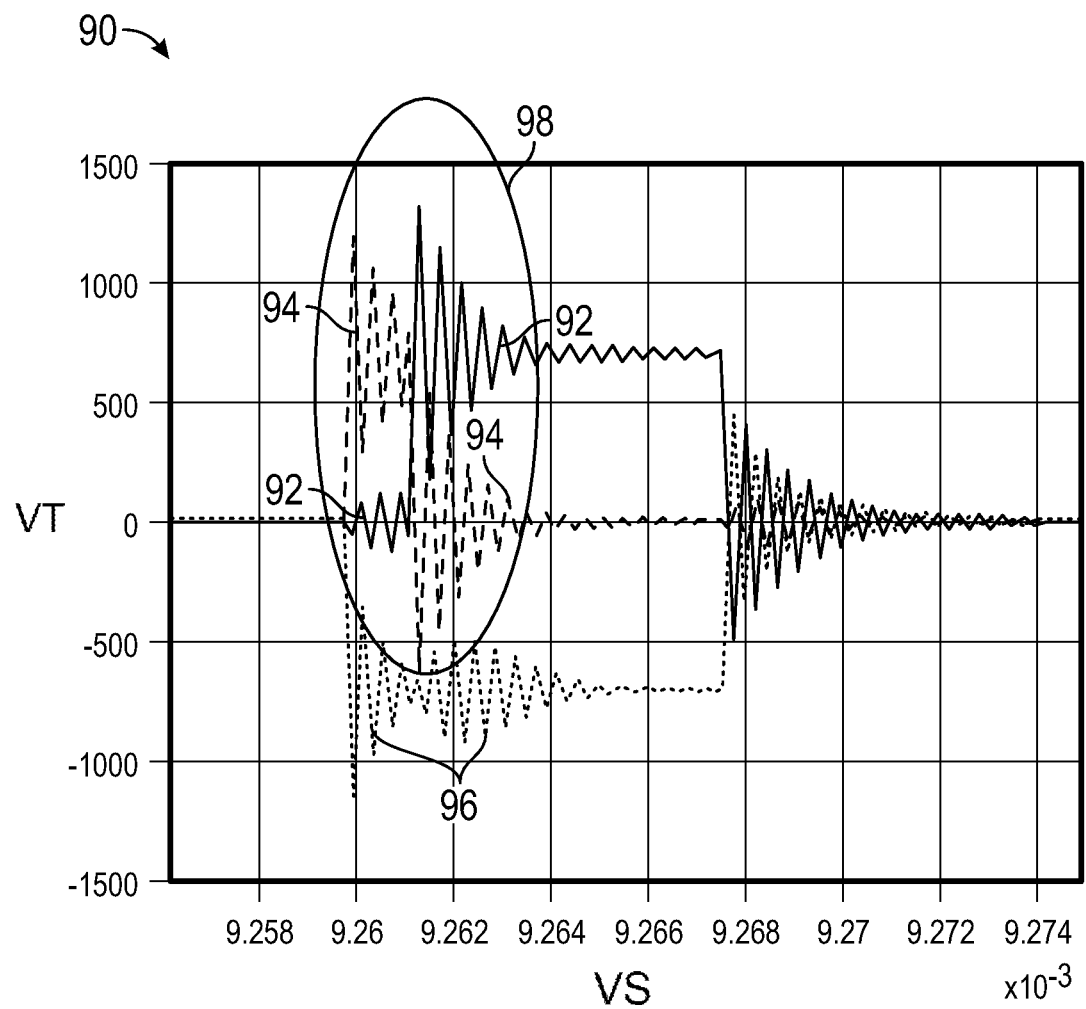
FIG. 3 shows an example of cross-coupling effects that can occur due to overlapping modulation signals.

FIG. 3 depicts an example of measurements performed during vehicle propulsion to drive an electric motor, such as the motor 20. In this example, voltages were measured at the UW, VW and VU terminals (See FIG. 2).

The voltages are shown in a graph 90. The UW terminal voltage is represented by curve 92, the VW terminal voltage is represented by curve 94, and the VU terminal voltage is represented by curve 96.

If switching events occur sufficiently close in time, such that switching events happen simultaneously or overlap, cross-coupling effects can occur. For example, if the VW terminal was excited (as shown by the curve 94) slightly before the UW terminal was excited (curve 92), the UW terminal will experience cross-coupling effects as voltage spikes in region 98.

Information such as this can be used to calibrate control of the inverter 38 so that switching speed control is triggered under conditions in which cross-coupling effects and other negative effects are expected to occur. For example, a lookup table or other data structure can be generated for use by the switching control system 40 to determine when to adjust switching speed.

To reduce such cross-coupling effects, timing information (e.g., PWM parameters) is monitored to determine a separation between a switching event and an upcoming switching event, and the separation is compared to an overlap window. For example, if the separation between phase A and phase B excitation (e.g., an amount of overlap between switching events) is less than a minimum time, switching speed of the switch 60 is reduced to avoid the cross-coupling. The amount of switching speed reduction may be proportional to an observed or expected voltage spike.

In an embodiment, the minimum time for a given switching cycle is determined based on PWM control signals. The PWM control signals correspond to the timing and duty cycles prescribed by a PWM control scheme.

Figure 4:
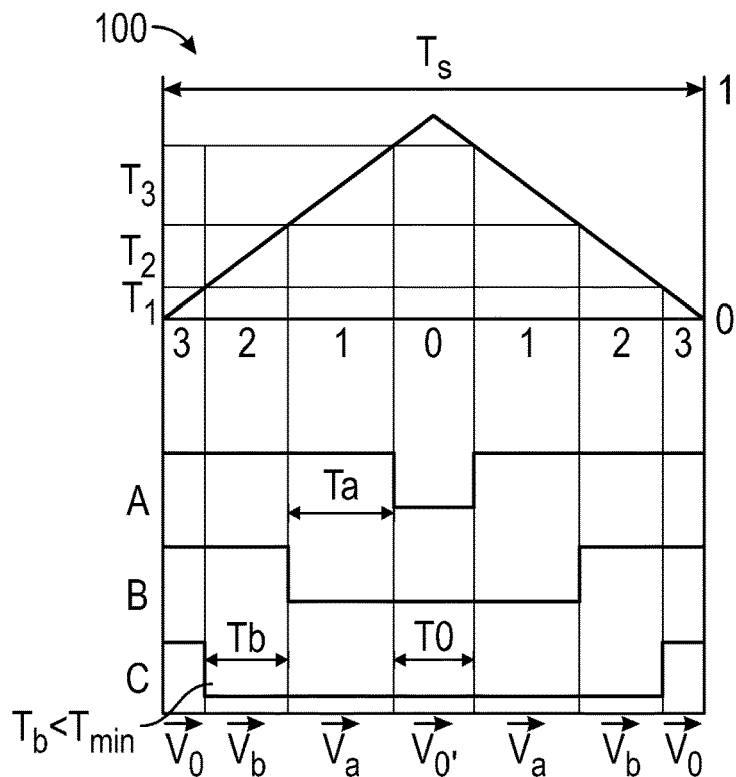
FIG. 4 depicts a timing diagram and aspects of control of switching speed, in accordance with an exemplary embodiment.

FIG. 4 depicts an example of a PWM timing diagram 100 representing PWM control parameters. The timing diagram shows the times of switching events (a switching event occurs when a switch is turned on or off) during a sampling period Ts. $T_1$, $T_2$ and $T_3$ are counter values used for PWM control.

Switching events are represented by vectors Va, Vb and V0 for each phase. Vectors Va and Vb are non-zero vectors, where each vector represents a switching event that transitions between switching states of all of the switches in the three-phase inverter 38. A switching event causes a transition between switching states, which causes a voltage increase or reduction (and thereby defines a beginning or end of a pulse). For example, as shown in the timing diagram 100, vector Vb corresponds to a switching event that transitions from a switching state to start a phase C pulse, and Va corresponds to a switching event that transitions from a switching state to start a phase B pulse.

Each switching event has a dwell time, defined as an amount of time between a switching event and the next switching event in a switching cycle. For example, each vector has an associated dwell time (i.e., Va has a dwell time Ta, Vb has a dwell time Tb and V0 has a dwell time T0).

In an embodiment, the time difference between two events is a dwell time of a switching event. The dwell time is compared to a minimum time value $T_{min}$, and if the dwell time is less than the minimum time $T_{min}$, the switching speed is adjusted to avoid cross-coupling or otherwise to reduce negative effects. For example, as shown in FIG. 4, the dwell time Tb is less than the minimum time $T_{min}$. In this example, a phase B gate driver (e.g., a gate driver connected to the switch 68 or 70) is controlled to slow down the switching speed.

In an embodiment, the switching control system 40 is configured to control PWM parameters according to space vector (SV) PWM modulation, which uses a vector approach that confines space vectors to be applied according to a region in which an output voltage vector is located.

In SV modulation, a reference vector $V_{ref}$ is synthesized based on sampled voltages of the three-phase currents, and voltage control is realized based on which sector the reference vector is in.

Figure 5:
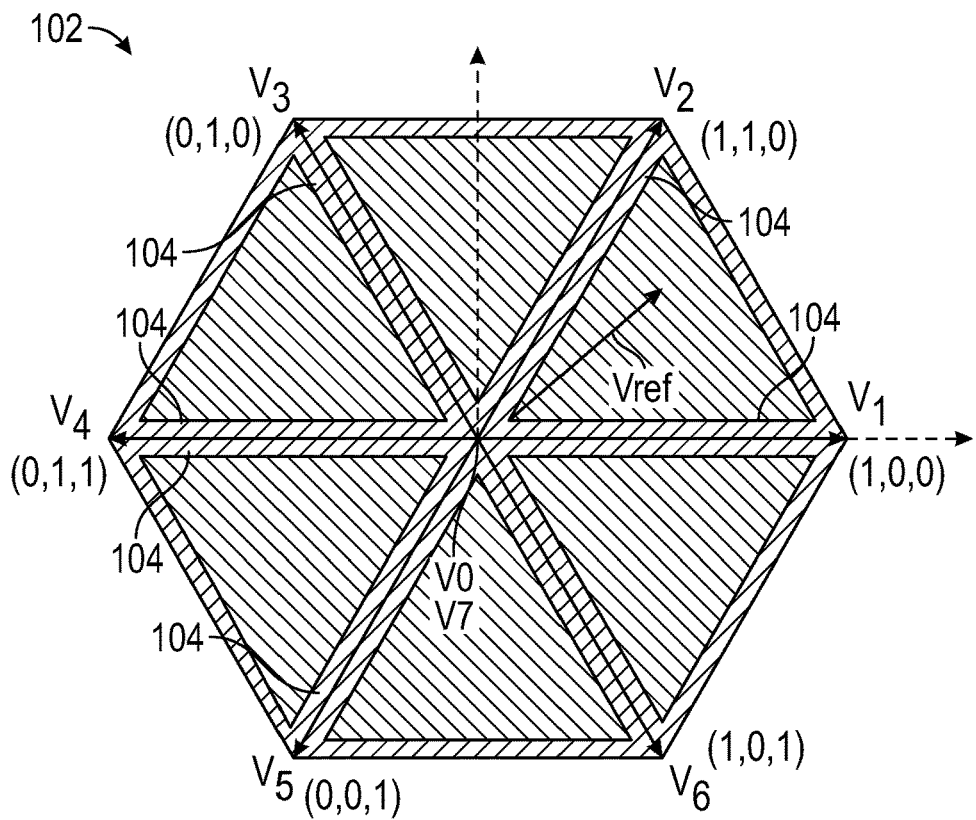
FIG. 5 depicts a space vector diagram and aspects of control of switching speed, in accordance with an exemplary embodiment.

FIG. 5 is a stationary frame voltage sector map 102, representing various switching states and conditions between switching states. In this example, the map 102 is a hexagon for a three-phase inverter (e.g., the inverter 38) that includes six sectors. The sectors are defined by six stationary non-zero vectors, which split the map 102 into six 60-degree regions. Two zero voltage vectors V0 and V7 represent switching states for which the output voltages are zero. Vector V0 represents a switching state in which switches 64, 68 and 72 are off (open), and switches 66, 70 and 74 are on (closed). Vector V7 represents a switching state in which switches 64, 68 and 72 are closed, and switches 66, 70 and 74 are open.

Six non-zero vectors form the six vertices of the hexagon and represent non-zero switching states. The following table shows the switching states of the inverter 38 at each non-zero switching state.

| Vector | Switch 64 | Switch 68 | Switch 72 | Switch 66 | Switch 70 | Switch 74 |
|---|---|---|---|---|---|---|
| $V_1$ {100} | ON | OFF | OFF | OFF | ON | ON |
| $V_2$ {110} | ON | ON | OFF | OFF | OFF | ON |
| $V_3$ {010} | OFF | ON | OFF | ON | OFF | ON |
| $V_4$ {011} | OFF | ON | ON | ON | OFF | OFF |
| $V_5$ {001} | OFF | OFF | ON | ON | ON | OFF |
| $V_6$ {101} | ON | OFF | ON | OFF | ON | OFF |

As a switching cycle progresses, the reference vector $V_{ref}$ is synthesized at each sampling time based on one or both zero vectors and a combination of two adjacent non-zero vectors. In the example of FIG. 5, the reference vector is in the first sector, and is between (adjacent) to the non-zero vectors V1 and V2.

Switching speed control is implemented when the reference vector $V_{ref}$ is determined to be within a selected temporal distance or selected angle relative to a sector crossing. For example, when between switching states (1,0,0) and (1,1,0), the reference vector moves between sector crossings (vectors V1 and V2). As the reference vector approaches a sector crossing, the time windows for switching events get smaller, and if the time windows are sufficiently small, the potential for negative effects increases. Thus, the control methods described herein prescribe slowing the switching speed of one switch to reduce such effects.

Thus, in an embodiment, the minimum time or time threshold is defined relative to sector crossings by regions 104 defined relative to the non-zero vectors. The thresholds are represented by regions 104 defined along each non-zero vector. The angular extent or thickness of each region 104 is determined during calibration or planning, and corresponds to a time threshold, such that when the reference vector is within a region 104, the control system 40 is triggered to adjust the switching speed of a switch in a relevant phase leg.

Switching speed or slew rate can be adjusted in any suitable manner. In an embodiment, each gate driver can control a capacitor and/or resistor connected to a respective switch. This allows for varying the resistivity and/or capacitance of the switch gate, and thereby controlling switching speed. For example, a variable resistor is connected in series with a gate of a switch. In another example, an electronically variable capacitor (EVC) is connected to parallel with the gate to control gate-source capacitance (Cgs). The variable capacitor may be a voltage variable capacitor, a piezoelectric capacitor (e.g., MEMS piezoelectric capacitor) or any other suitable device.

Figure 6:
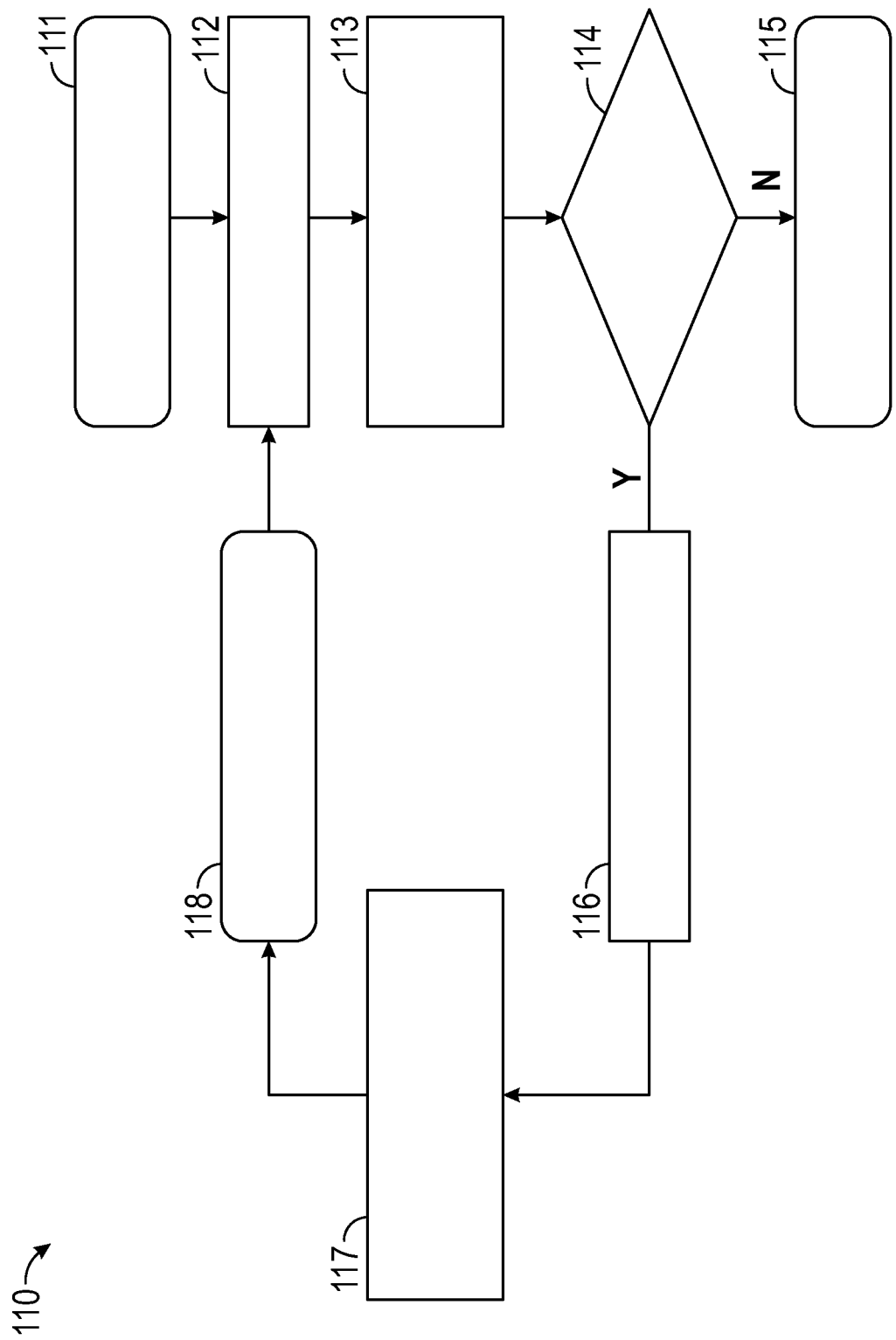
FIG. 6 is a flow diagram depicting aspects of a method of controlling switching in a vehicle inverter, in accordance with an exemplary embodiment.

FIG. 6 illustrates embodiments of a method 110 of controlling switching speed of semiconductor switches in an electronic device. The method 110 is discussed in conjunction with controlling the vehicle 10 and controlling switching speeds of the inverter 38, but is not so limited and can be applied to any other suitable vehicle and any suitable device or system having an inverter.

Aspects of the method 110 may be performed by a processor or processors, such as the controller 82 and/or the gate driver 84, a vehicle control unit and/or the computer system 42. It is noted the method 110 is not so limited and may be performed by any suitable processing device or system, or combination of processing devices.

The method 110 includes a number of steps or stages represented by blocks 111-118. The method 110 is not limited to the number or order of steps therein, as some steps represented by blocks 111-118 may be performed in a different order than that described below, or fewer than all of the steps may be performed.

At block 111, the vehicle 10 is operated and the processing device monitors inverter operation and vehicle operating conditions. Examples of vehicle operating conditions include motor torque, motor speed, vehicle speed, temperature and others.

At block 112, the processing device receives timing information and a PWM duty cycle command. At block 113, the processing device computes or otherwise determines a time threshold for switch speed control. For example, a minimum time $T_{min}$ is calculated based on the duty cycle or dwell time between a switching event and an upcoming switching event (e.g., via the duty cycle command).

At block 114, the dwell time is compared to the minimum time $T_{min}$. At block 115, if the dwell time is greater than $T_{min}$, switching is performed according to the PWM command without adjusting switching speed.

At block 116, if the dwell time is less than $T_{min}$, the processing device determines that switch speed control is needed. At block 117, the phase of the upcoming switching event is identified, and a switch associated with the identified phase is also identified. At block 118, the switching speed is reduced or otherwise adjusted.

The switching control methods described herein may be triggered based on various conditions. In an embodiment, the step at block 111 may include determining based on vehicle operating conditions whether switching control is to be triggered. For example, certain operating conditions, such as low speed conditions (e.g., city driving), can trigger switching speed control.

Figure 7:
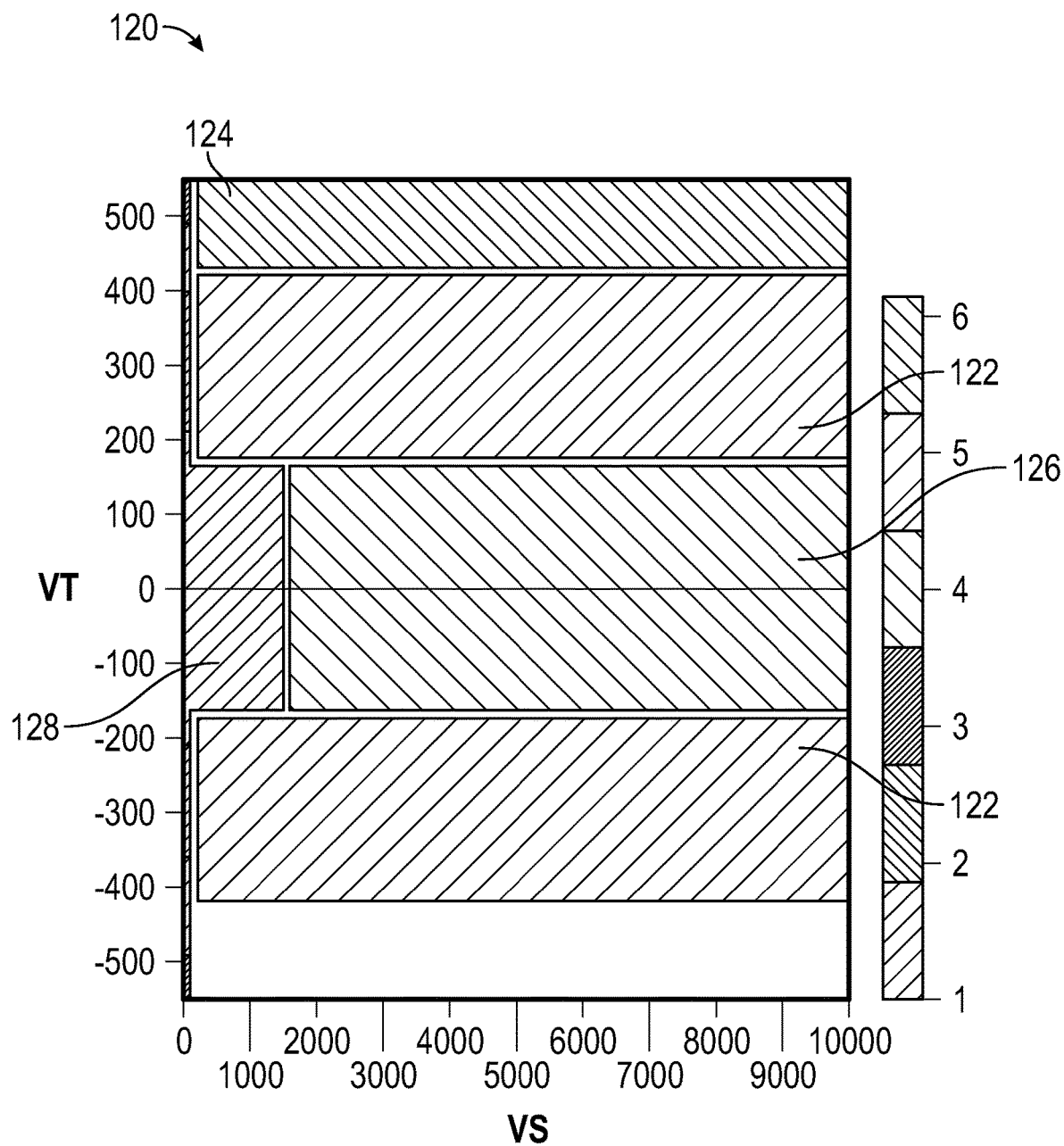
FIG. 7 is a torque-speed diagram specifying operating regions for which switching speed control is desired, in accordance with an exemplary embodiment.

FIG. 7 shows an example of conditions used to determine whether to perform switch speed control. The conditions are represented by a PWM region map 120 that prescribes modulation parameters used in different operating conditions. Regions are defined by vehicle speed (VS) in revolutions-per-minute (RPM) and torque (VT) in Newton-meters (Nm). In this example, regions 122 prescribe a 10 kilohertz (kHZ) SVPWM modulation, region 124 prescribed a 10 kHz discrete PWM (DPWM) modulation, and region 126 prescribes 20 KHz DPWM.

Operating conditions represented by region 128 (are known to produce bearing currents and voltage overshoot. Thus, the processing device is configured to commence switch speed control during vehicle operation when speed and torque fall within the region 126.

Figure 8:
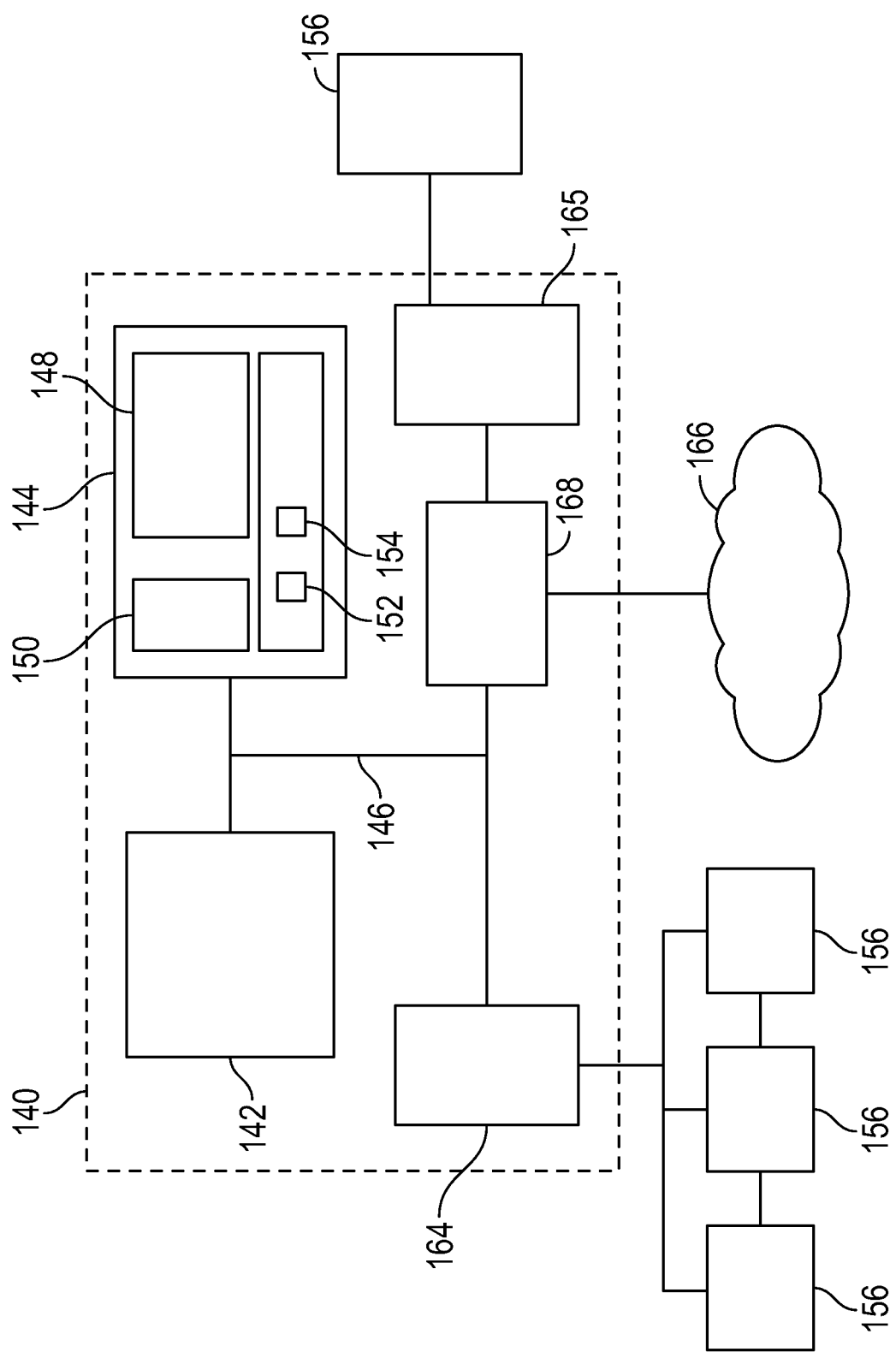
FIG. 8 depicts a computer system in accordance with an exemplary embodiment.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media.

Such media can be any available media that is accessible by the processing device 142, and includes both volatile and non-volatile media, and removable and non-removable media.

For example, the system memory 144 includes a nonvolatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to controlling operation of inverters and other conversion devices as discussed herein. A module or modules 154 may be included to perform functions related to controlling slew rates or switching speeds as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 140. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system comprising:
an inverter configured to output multiphase alternating current (AC) currents to an electric motor, the multiphase AC currents including a first phase current and a second phase current, the inverter including a set of switches for each phase current; and
a switching controller operably connected to each set of switches, the switching controller configured to control a gate driver connected to a switch of the set of switches, the switching controller configured to determine a time difference between a first switching event of a first phase and a second switching event of a second phase during a switching cycle, and control a switching speed of the switch based on the time difference, wherein the time difference is determined based on timing information specifying a timing of switching events according to a modulation scheme, the timing information including space vector information representing the multiphase AC currents.

2. The system of claim 1, wherein the switching controller is configured to control the switching speed by varying at least one of a capacitor and a resistor connected to the switch.

3. The system of claim 2, wherein the modulation scheme is pulse width modulation (PWM).

4. The system of claim 2, wherein the time difference is determined based on a duty cycle specified by the timing information.

5. The system of claim 1, wherein the switching controller is configured to compare the time difference to a time threshold representing a desired separation between the first switching event and the second switching event, and adjust a switching speed of the switch based on the time difference being less than the time threshold.

6. The system of claim 5, wherein the time difference is determined based on a dwell time between the first switching event and the second switching event.

7. The system of claim 1, wherein, the space vector information including a plurality of space vectors representing switching states, the space vectors defining a plurality of sectors.

8. The system of claim 7, wherein the time difference is determined based on a synthesized reference vector, the time threshold is a minimum distance between the synthesized reference vector and a space vector, and the switching controller is configured to adjust the switching speed based on an estimated distance between the synthesized reference vector and the space vector being less than the minimum distance.

9. The system of claim 1, wherein controlling the switching speed is applied to only one switch of the inverter.

10. A method comprising:
receiving electrical power by an inverter configured to output multiphase AC currents to an electric motor, the multiphase AC currents including a first phase current and a second phase current, the inverter including a set of switches for each phase current, each switch of the set of switches controllable by a gate driver;
determining a time difference between a first switching event of a first phase and a second switching event of a second phase during a switching cycle; and
controlling a gate driver connected to a switch of the set of switches to control a switching speed of the switch based on the time difference, wherein the time difference is determined based on timing information specifying a timing of switching events according to a modulation scheme, the timing information including space vector information representing the multiphase AC currents.

11. The method of claim 10, wherein the switching speed is controlled by varying at least one of a capacitor and a resistor connected to the switch.

12. The method of claim 10, wherein determining the time difference includes comparing the time difference to a time threshold representing a desired separation between the first switching event and the second switching event, and controlling the gate driver is performed to adjust a switching speed of the switch based on the time difference being less than the time threshold.

13. The method of claim 11, wherein the time difference is determined based on a dwell time between the first switching event and the second switching event.

14. The method of claim 10, wherein the space vector information including a plurality of space vectors representing switching states, the space vectors defining a plurality of sectors.

15. The method of claim 14, wherein the time difference is determined based on a synthesized reference vector, the time threshold is a minimum distance between the synthesized reference vector and a space vector, and controlling the gate driver is performed to adjust the switching speed based on an estimated distance between the synthesized reference vector and the space vector being less than the minimum distance.

16. The method of claim 10, wherein controlling the switching speed is applied to only one switch of the inverter.

17. A vehicle system, comprising:
an inverter configured to output multiphase AC currents to an electric motor for propulsion of the vehicle, the multiphase AC currents including a first phase current and a second phase current, the inverter including a set of switches for each phase current; and
a processor configured to:
determine a time difference between a first switching event of a first phase and a second switching event of a second phase during a switching cycle;
compare the time difference to a time threshold representing a desired separation between the first switching event and the second switching event; and
based on the time difference being less than the time threshold, control a gate driver connected to a switch of the set of switches to adjust a switching speed of the switch, wherein the time difference is determined based on timing information specifying a timing of switching events according to a modulation scheme, the timing information including space vector information representing the multiphase AC currents.

18. The vehicle system of claim 17, wherein the gate driver is controlled to adjust a switching speed of the switch based on a time difference being less than a time threshold, the time threshold representing a desired separation between the first switching event and the second switching event.

19. The vehicle system of claim 17, wherein the time difference is determined based on a dwell time between the first switching event and the second switching event.

20. The vehicle system of claim 17, wherein the space vector information includes a plurality of space vectors representing switching states and defining a plurality of sectors, wherein the time difference is determined based on a synthesized reference vector, the time threshold is a minimum distance between the reference vector and a space vector, and the control of the gate driver includes adjusting the switching speed based on an estimated distance between the reference vector and the space vector being less than the minimum distance.

* * * * *